(12) United States Patent
Veeraraghavan et al.

(10) Patent No.: US 12,534,611 B2
(45) Date of Patent: Jan. 27, 2026

(54) ENERGY SAVING, EXPANDABLE, PUMPABLE, ANTI-FLUTTER COMPOSITIONS FOR USE IN AUTOMOTIVE BODY-IN-WHITE (BIW) APPLICATIONS

(71) Applicants: Thanikaivelan Tindivanam Veeraraghavan, Newburgh, IN (US); Karthikeyan Sengotaiyan, Newburgh, IN (US); Senthilkumar Veeraraghavan, Newburgh, IN (US)

(72) Inventors: Thanikaivelan Tindivanam Veeraraghavan, Newburgh, IN (US); Karthikeyan Sengotaiyan, Newburgh, IN (US); Senthilkumar Veeraraghavan, Newburgh, IN (US)

(73) Assignee: Uniseal, Inc., Evansville, IN (US)

( * ) Notice: Subject to any disclaimer, the term of this patent is extended or adjusted under 35 U.S.C. 154(b) by 803 days.

(21) Appl. No.: 17/875,554

(22) Filed: Jul. 28, 2022

(65) Prior Publication Data
US 2024/0043676 A1 Feb. 8, 2024

(51) Int. Cl.
*C08L 27/06* (2006.01)
*C08J 9/00* (2006.01)
*C08L 9/04* (2006.01)
*C08L 9/08* (2006.01)

(52) U.S. Cl.
CPC ............ *C08L 27/06* (2013.01); *C08J 9/0061* (2013.01); *C08L 9/04* (2013.01); *C08L 9/08* (2013.01); *C08L 2205/025* (2013.01); *C08L 2205/035* (2013.01)

(58) Field of Classification Search
CPC ...................................................... C08L 27/06
See application file for complete search history.

(56) References Cited

U.S. PATENT DOCUMENTS

| | | | |
|---|---|---|---|
| 2,510,727 A | 6/1950 | Sussenbach | |
| 3,214,564 A | 10/1965 | Katzer et al. | |
| 3,493,257 A | 2/1970 | Fitzgerald et al. | |
| 3,850,474 A | 11/1974 | Welch | |
| 3,855,378 A * | 12/1974 | Topcik | C08J 9/06 521/149 |
| 3,873,348 A | 3/1975 | Reilly et al. | |
| 4,252,906 A | 2/1981 | Hosokawa et al. | |
| 4,391,318 A | 7/1983 | Maxey et al. | |
| 4,456,706 A | 6/1984 | Siedenstrang et al. | |
| 4,569,382 A | 2/1986 | Maxey et al. | |
| 4,680,316 A | 7/1987 | Douglas | |
| 4,693,772 A | 9/1987 | Douglas | |
| 4,978,474 A | 12/1990 | Johnston | |
| 6,830,799 B1 | 12/2004 | Duffin et al. | |
| 8,973,809 B2 | 3/2015 | Hill et al. | |
| 9,632,268 B2 | 4/2017 | Coenegracht et al. | |
| 2010/0113628 A1* | 5/2010 | Kendra | C08L 23/0853 521/139 |
| 2013/0280451 A1* | 10/2013 | Kobayashi | C08J 9/32 428/35.2 |
| 2014/0088211 A1* | 3/2014 | Hayashi | C08J 9/236 521/59 |
| 2015/0166825 A1* | 6/2015 | Godschalx | C09J 151/04 525/65 |
| 2017/0002164 A1* | 1/2017 | Kohlstrung | C08J 9/105 |
| 2017/0015824 A1 | 1/2017 | Gozalo et al. | |
| 2018/0037708 A1* | 2/2018 | Lin | C08K 3/26 |
| 2019/0016866 A1* | 1/2019 | Okuno | C08L 25/02 |
| 2021/0061981 A1* | 3/2021 | Frick | C08J 9/0052 |

FOREIGN PATENT DOCUMENTS

CN 110643306 1/2020

OTHER PUBLICATIONS

PCT Written Opinion of the International Searching Authority for International Application No. PCT/US23/020539 mailed Aug. 23, 2023.

* cited by examiner

*Primary Examiner* — Irina Krylova
(74) *Attorney, Agent, or Firm* — King & Partners, PLC

(57) ABSTRACT

A low temperature curable anti-flutter composition which cures to form a cured product, including: (a) a first copolymer, wherein the first copolymer comprises a rubber having at least one nitrile functional group; and (b) a second copolymer, wherein the second copolymer comprises a rubber having styrene-butadiene functional groups, wherein the composition is a room temperature pumpable sealant which is capable of expanding and curing at temperatures below 140° C. in less than 15 minutes.

2 Claims, 2 Drawing Sheets

ENERGY SAVING, EXPANDABLE, PUMPABLE, ANTI-FLUTTER COMPOSITIONS FOR USE IN AUTOMOTIVE BODY-IN-WHITE (BIW) APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to automotive sealants, and, more particularly, to anti-flutter sealants that are used to adhere to and isolate outer panels (e.g., hoods, A-pillars, B-pillars, C-pillars, roofs, doors, deck lids, etcetera) from inner reinforcement. These outer panels are required to adhere to steel, aluminum, metal alloys, and carbon fiber-reinforced polymer (CFRP) substrates.

Anti-flutter sealants are commonly used in the automotive industry to seal or fill in the gaps between the body panels of the automobile. These anti-flutter sealants are routinely applied in areas where the frame of the automobile has joints (e.g., hoods, A-pillars, B-pillars, C-pillars, roofs, doors, deck lids, etcetera) to prevent and/or minimize water, dust, air intrusion, noise, vibration and corrosion.

The present invention is directed to an automobile adhesive/sealant, and in particular to a low-temperature curing type anti-flutter sealant and the preparation thereof. The low temperature curing anti-flutter compositions of the present invention preferably comprise a nitrile copolymer rubber, such as a hydrogenated copolymer of an unsaturated nitrile and a hydrogenated copolymer of a conjugated diene, a cross-linked styrene butadiene rubber, a poly vinyl chloride (PVC) resin, a plasticizer, an adhesion promoter, a filler, a peroxide curing agent, a wetting agent, and a blowing agent.

The anti-flutter sealant formulations of the present invention cure at low temperature in less time compared to conventional anti-flutter sealants, and they fulfill all the automotive test requirements, including, but not limited to, adhesion, expansion, elongation and long-term performance like corrosion, heat and moisture resistance.

2. Background Art

Currently, in the automotive manufacturing process, the electrodeposition bake cycle is approximately 30-60 minutes at a temperature of approximately 340-400° F. Because of this, conventional sealants are developed and used which cure at elevated temperatures. The reason for this, is that the sealants are applied on the body parts of the car prior to the electrodeposition bake cycle. As such, the e-coat and sealants get baked at the same time.

However, due to the high cost of energy and time emphasis on vehicle manufacturing, there is significant pressure within the automotive industry to reduce both the operating temperatures and manufacturing time. The automobile manufacturers are striving to complete the electrodeposition bake cycle in less than 30 minutes at a temperature of less than 300° F. Ideally, the automobile manufacturers are striving to complete the electrodeposition bake cycle in approximately 10-20 minutes at a temperature at or below 280-290° F. As such, curing of conventional anti-flutter sealants under these new conditions will be adversely affected.

Currently available anti-flutter sealants need a minimum of 30 minutes at 340° F. to properly cure. The anti-flutter sealants of the present invention have been surprisingly effective and properly cure in approximately 15 minutes at a temperature of only 285° F.—and in some cases significantly lower.

Simple energy consumption models show that lowering the oven set point temperatures by only 55° F. and reducing manufacturing time by as little as 10 minutes results in an energy savings of around 10-15%, which is not only significant, but critically important toward being environmentally responsible at a global level. Moreover, by lowering the curing time, more cars can be manufactured per hour, thereby reducing production costs.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The automotive industry is striving to reduce vehicle weight toward increasing fuel economy and reducing emissions. The automobile manufacturers are using different substrates to reduce the weight of the automobile, such as aluminum and composites, in conjunction with steel to optimize vehicle performance. However, incorporating mixed-material joining (CFRP/metal) designs creates multiple challenges. First, the mismatch in coefficient of linear thermal expansion (CLTE) presents challenges when dissimilar substrate assemblies are exposed to heat as the substrates are often not compatible with conventional joining techniques, such as adhesion. Alternative manufacturing techniques and materials must compensate for differences in thermal expansion. The low temperature anti-flutter sealants of the present invention mitigate such problems. These low temperature anti-flutter adhesives or sealants provide excellent adhesion to standard automotive OEM steel, aluminum and composite substrates, and also prevent bond line-readthrough (BLRT).

While sustainable vehicle design has become a major trend in car production, so has sustainable performance realization. Performance expectations, economic, legislative and environmental targets are influencing automotive OEM's thinking and driving the need for durable manufacturing adhesives that improve stiffness, crash durability and fatigue performance, as well as contribute to weight-reduction strategies. These include incorporating mixed-material joining (CFRP/metal). The low temperature curable anti-flutter adhesives/sealants of the present invention match and/or exceed these challenging design requirements.

While desirable, lowering of the reaction temperature of these complicated sealants is by no means a simple matter. For example, typically contained in the sealant is a blowing agent that causes the sealant to expand. Also, these sealants use a curing agent that causes the sealant to cure. Additionally, the sealant must flow properly during the heating cycle to seal effectively. All of these three reactions happen simultaneously to one extent or another during the bake cycle. Therefore, a balance between the rapidity of the flow of the sealant, and the expansion as well as the timing of the cure are critical for the sealant to perform properly.

To address these difficulties, the present invention utilizes low temperature, curable, pumpable anti-flutter, thermosetting compositions based on rubber copolymers NBR, SBR, and PVC that are preferably associated with a filler and a plasticizer. The present invention is also directed to methods of manufacturing using the anti-flutter adhesives or sealants disclosed herein.

The low temperature curing anti-flutter sealants of the present invention are preferably based on olefinic double bond holding rubbers, PVC resins, curing agents, blowing agents, plasticizers, and adhesion promoters that can perform multiple functions, such as a sealing function (e.g., eliminate air, dust and water intrusion), an anti-flutter function (e.g., prevent airborne sound and structure-borne noise by metal-to-metal vibration) and a structural stiffening function (e.g., inner to outer panel reinforcement).

Especially in vehicle construction, the anti-flutter sealants are formulated in such a way that upon curing they exhibit a volume expansion of 0-700%, more preferably 10-600%, and yet more preferably 20-500%. The cured sealant or foam should preferably exhibit a hardness maximum of 50 (Shore A), and more preferably a maximum of 40 (Shore A).

The low temperature curable anti-flutter reactive compositions of the present invention preferably include at least one of the following substances/materials, namely: solid rubbers/elastomers, PVC homo polymers or copolymers, curing agents, fillers, adhesion promoters, blowing agents, plasticizers, antioxidants, wetting agents, and rheology modifiers.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
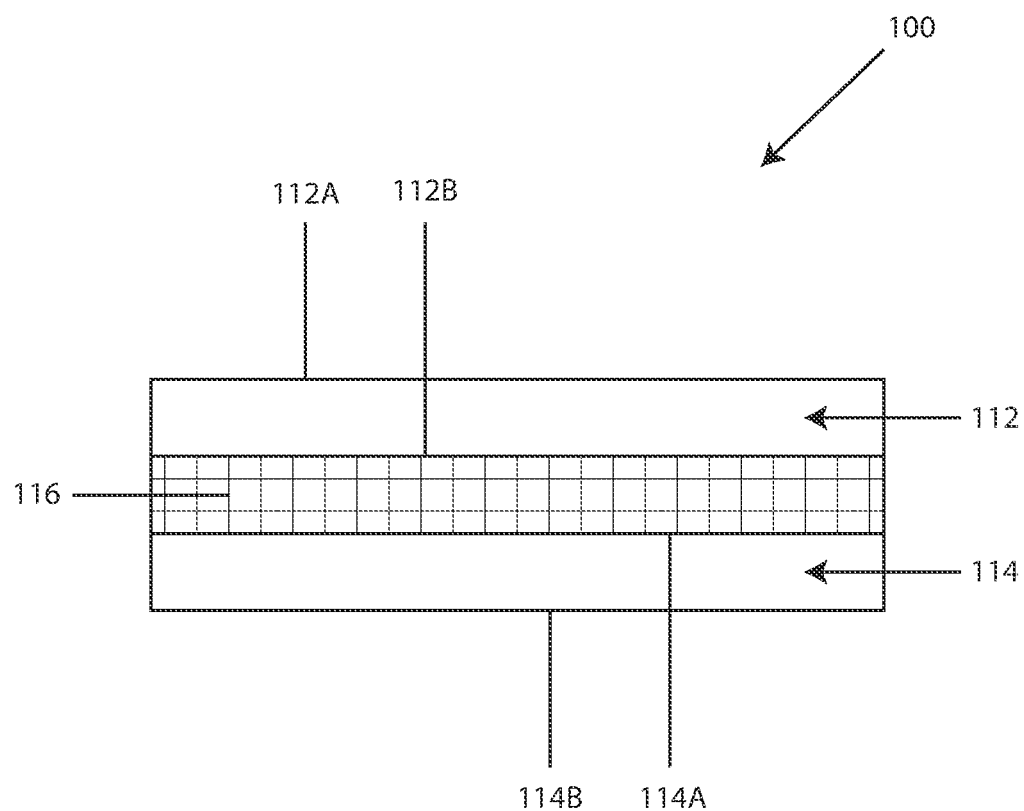
Figure 2:
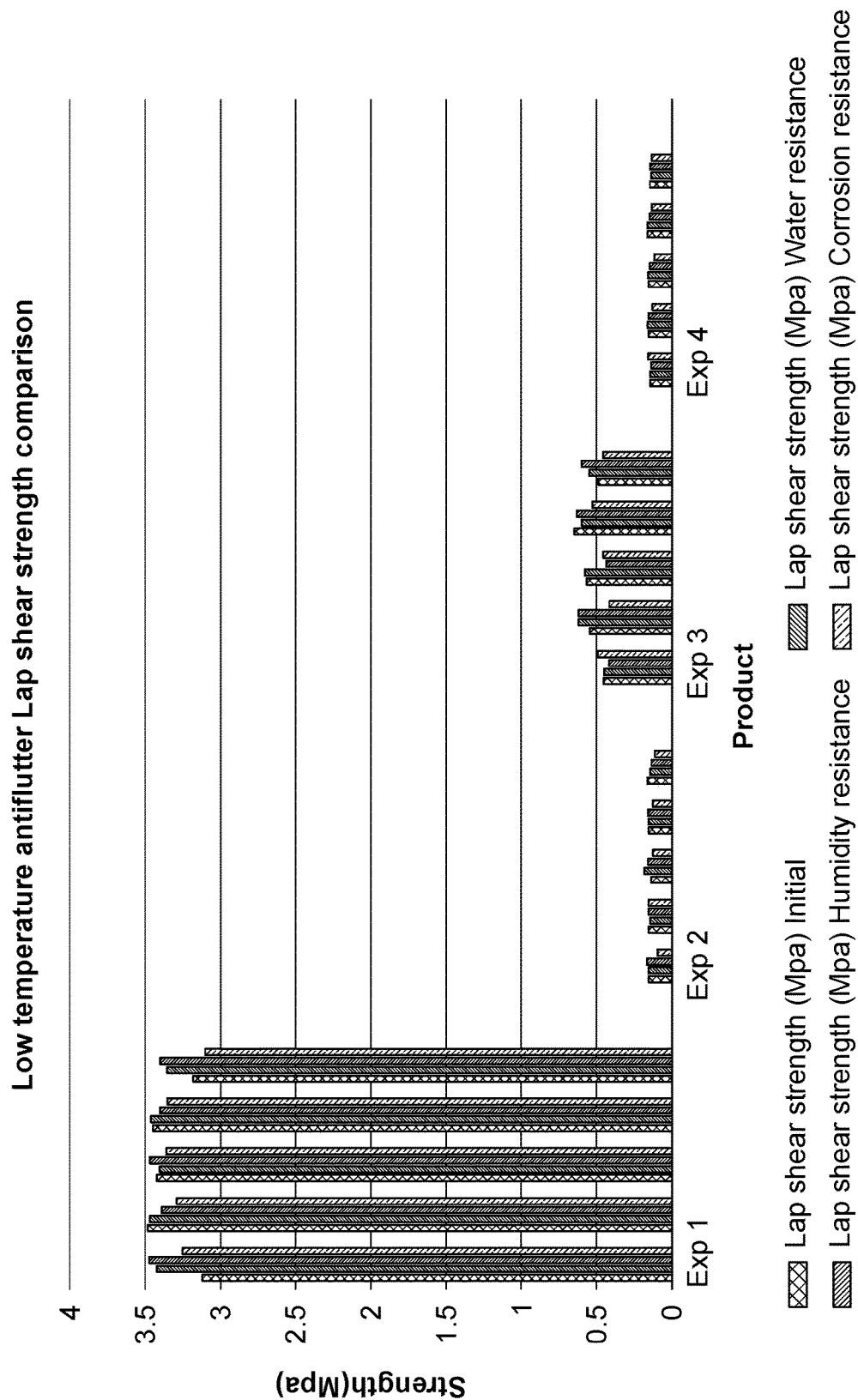

The invention will now be described with reference to the drawings wherein:

FIG. 1 of the drawings is a cross-sectional schematic representation of a component assembly (e.g., a automobile component sub-assembly) associated with an anti-flutter sealants in accordance with the present invention; and FIG. 2 of the drawings is a two-dimensional plot showing lap shear strength comparison.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

As will be discussed and shown experimentally hereinbelow, the present invention is directed to novel, low temperature, curable, anti-flutter compositions which cure to form cured products, including: (a) a first copolymer, wherein the first copolymer comprises a rubber having at least one nitrile functional group; and (b) a second copolymer, wherein the second copolymer comprises a rubber having a styrene-butadiene functional group or functionality, wherein the compositions are room temperature pumpable sealants and capable of expanding and curing at temperatures below 140° C. in less than 15 minutes. The compositions of the present invention are useful as anti-flutter sealants that are used to adhere to and isolate outer panels (e.g., hoods, A-pillars, B-pillars, C-pillars, roofs, doors, deck lids, etcetera) from inner reinforcement in, for example, automotive applications.

Referring now to the drawings, and to FIG. 1 in particular, component assembly 100 is shown, which generally comprises first substrate 112 having first surface 112A and second surface 112B, second substrate 114 having first surface 114A and second surface 114B, and anti-flutter cured product 116. It will be understood that component assembly 100 may comprise, for illustrative purposes only, a subassembly or part of an automobile. Indeed, the anti-flutter cured products of the present invention are suitable for a plurality of applications.

First substrate 112 may be fabricated from any one of a number of materials, such as, for example, steel, steel electrogalvanized with zinc, steel hot dipped galvanized with zinc, aluminum, metal alloys, d-block metals, and combinations thereof. First substrate 112 may also be fabricated from carbon fiber-reinforced polymer substrates, as well as, for example, borosilicate glass, soda lime glass, float glass, natural and synthetic polymeric resins, plastics, and/or composites including Topas®, which is commercially available from Ticona of Summit, New Jersey. First substrate 112 is preferably fabricated from a sheet having a thickness ranging from approximately 0.25 mm to approximately 5.00 mm, and more preferably ranging from approximately 0.75 mm to approximately 2.50 mm. It will be understood, that unless specified otherwise, the term approximately, as used herein, will be defined as the value, number, and/or integer +/−10 percent. Of course, the thickness of the substrate will depend largely upon the particular application of the assembly. While particular substrate materials have been disclosed, for illustrative purposes only, it will be understood that numerous other substrate materials are likewise contemplated for use—so long as the materials exhibit appropriate physical properties, such as strength, to be able to operate effectively in conditions of intended use. Indeed, substrate assemblies in accordance with the present invention can be, during normal operation, exposed to extreme temperature variation, as well as substantial UV radiation, emanating primarily from the sun.

Second substrate 114 may be fabricated from similar and/or dissimilar materials as that of first substrate 112. As such, second substrate 114 may comprise polymers, metals, glass, and ceramics—to name a few. Second substrate 114 is preferably fabricated from a sheet having a thickness ranging from approximately 0.25 mm to approximately 5.00 mm, and more preferably ranging from approximately 0.75 mm to approximately 2.50 mm.

As will be discussed herein below, anti-flutter cured product 116 is preferably formed from a low temperature, curable, anti-flutter composition, comprising: a first copolymer, wherein the first copolymer comprises a rubber having at least one nitrile functional group; and a second copolymer, wherein the second copolymer comprises a rubber having a styrene-butadiene functional group/moiety and/or styrene-butadiene functionality. In accordance with the present invention, the anti-flutter composition converts into cured product 116 at temperatures below approximately 140° C. in less than approximately 15 minutes.

Preferred components of the low temperature, curable, anti-flutter compositions of the present invention are provided below.

Elastomers/Rubbers

The low temperature, curable, anti-flutter compositions of the present invention preferably include a rubber component. Suitable examples, include, foam rubbers, natural rubbers, polyisoprene rubbers, acrylonitrile-butadiene rubbers (NBR), styrene-butadiene rubbers (SBR), ethylene-vinyl acetate (EVA) copolymers, polybutadiene rubbers, styrene-butadiene-styrene (SBS) rubbers, styrene-ethylene-propylene-styrene (SEPS) copolymer rubbers, styrene-isoprene-styrene (SIS) copolymer rubbers, synthetic/natural isoprene rubbers, butyl rubbers, and combination thereof. These components may be used alone or in any combination of two or more together. The molecular weight and the like of the solid rubbers are not particularly limited as long as they are in ranges in which the solid rubber exhibit elastomeric qualities at approximately room temperature.

Provided below are non-limiting examples of structural formulas for certain rubbers suit for use in accordance with the present invention:

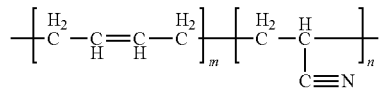

wherein m and n are independent integers ranging from 1 to 50,000, and more preferably from approximately 3,500 to approximately 17,500. Preferably, the ratio of m to n ranges from 1:1 to 1:7, and more preferably 1:1 to 1:4;

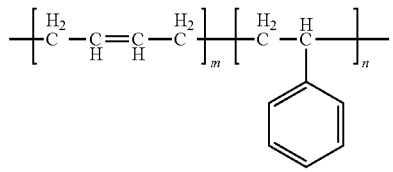

wherein m and n are independent integers ranging from 1 to 35,000, and more preferably from approximately 3,750 to approximately 15,750. Preferably, the ratio of m to n ranges from 1:1 to 1:5, and more preferably 1:1 to 1:3.

The Mooney viscosity (ML1+4(100° C.) of the solid rubber is not particularly limited, but preferably in the range of approximately 20 to approximately 60, and more preferably in the range of approximately 30 to approximately 50. The Mooney viscosity can be measured according to ASTM D1646-19A.

The low residual levels of backbone unsaturation results in enhanced heat aging resistance. When peroxide cured, NBR possesses excellent compression set. In addition, the presence of polar acrylonitrile groups along the polymer chain imparts a high level of adhesion characteristics on oily metal surfaces and very good compatibility with PVC resins based on NBR. For these reasons, NBR is a preferred component in the curable anti-flutter sealant/adhesive.

The compositions of the present invention are useful as multi-functional filling materials for hollow bodies or sections in the car or truck building industry. They fulfil at the same time a sealing function, an acoustic vibration dampening function and have a powerful stiffening effect of the hollow bodies.

Blends of polyvinyl chloride and nitrile rubber (copolymers of butadiene and acrylonitrile) are known and have been used in a variety of applications. Such blends are often mixed with conventional sulfur or peroxide curative systems and cured to produce vulcanizates which exhibit good storage and color stability, good ozone and weather resistance, good oil resistance, heat resistance and abrasion resistance. Such vulcanizates may be used in applications such as bonding, sealing metal substrates, shoe soles, hose covers, printing roll covers and spinning cots.

In certain applications, it is desirable to use vulcanizates of flux blends which have an improved combination of ozone resistance, retention of elongation at break upon aging, and high aged and unaged tensile strength compared to those vulcanizates known in the art.

The universal synthetic resin PVC has excellent chemical corrosion resistance; the composite material blended from the NBR and PVC integrates the property advantages of the NBR and PVC, and overcomes the defects of the NBR and PVC, thereby becoming an important new rubber/plastic composite material. The high-acrylonitrile-content NBR and the PVC are blended so that the blended rubber has favorable oily metal adhesion. The various rubber items or the polyvinyl chloride product that with NBR/PVC blend adhesive have been shown to provide excellent service performance.

Commercially available examples of this component include, but are not limited to, Krynac XL3355, Krynac XL3375, Baymod N XL 33.61, Baymod N XL 33.64, Nipol 1022x59, Paracril P33.80XL, Paracril P33.55XL, Paracril P32.60XL, Paracril P32.50XL, Paracril 3380, Chemigum PBD, Chemigum P86F, Chemigum P83F, precross-linked grades Lion SBR 1009, SBR 4503C, Emulprene 1009L, and Emulprene 1009LCR.

Polyvinyl Chloride (PVC) Resins

In a preferred embodiment of the present invention, the low temperature curable sealant comprises a PVC homopolymer or copolymer with dispersion resin or blended resins. The low temperature curable sealant preferably contains PVC having a high molecular weight homopolymer and fast fusion copolymer or both combined. In yet another preferred embodiment of the present invention, the PVC homopolymer and copolymer are represented by the following chemical structures:

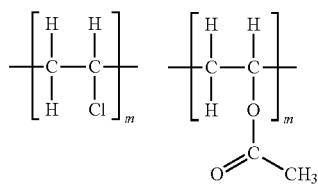

wherein m is an integer such that the average molecular weight of the homopolymers and copolymers range from approximately 60,000 to approximately 200,000.

By conventional definition a poly (vinyl chloride) (PVC) plastisol is comprised of a mixture of a PVC homopolymers or copolymers with a plasticizer. Both PVC homopolymers and copolymers having molecular weights ranging from 60,000 to 200,000 are applicable in this invention. Commonly used PVC copolymers are vinyl chloride-vinyl acetate copolymers. Other monomers with PVC include: vinylidene chloride, acrylonitrile, diethyl maleate, maleic anhydride, ethylene, propylene and other ester monomers. Polymers other than PVC may also be incorporated into the formulations to improve other performance variables. Resins should be chosen that produce a high yield along with a low viscosity under high shear. Rapid gelation, good foaminess, and fusion are preferred to improve processing speeds.

Dispersion Resins

The low temperature curable anti-flutter compositions of the present invention preferably contain one or more dispersion resins. Dispersion resins are preferably fine particles of PVC. These materials are produced from emulsion polymerization. Resins are classified into three areas: polymer type (homopolymer or copolymer), molecular weight, and particle size and shape. A copolymer is PVC resin that has been blended with a non-vinyl chloride monomer. Most common copolymers contain between 3% and 7% vinyl acetate. Copolymers are used in applications requiring low-fusion temperature or improved adhesion. High-molecular weight resins are used in applications requiring high physical properties. They require higher fusion temperatures and times to obtain these properties. Size and shape of the resin particles contribute to the viscosity characteristics of a plastisol. The particle size of a dispersion resin is approximately 0.5 to approximately 2.0 microns. Small particle sizes and irregular shapes increase the resin surface area, which increases plasticizer absorption and plastisol viscosity.

Plasticizers

The low temperature curable anti-flutter compositions of the present invention preferably contain one or more plasticizers to help fuse the PVC resin and achieve desired physical properties. Plasticizers are often used in thermoplastic polymers, thermosetting polymers, and elastomeric polymers and other numerous applications including, but not limited to, plastisols, dry blends, adhesives, sealants, caulks, architectural coatings, industrial coatings, OEM coatings, inks, overprint varnishes, polishes, and the like. In particular, when used in thermoplastic polymers, they are utilized to improve flexibility of the polymer in general, and they improve fusion behavior by lowering the glass transition temperature (Tg) of the polymer. Without wishing to be bound by any one particular theory, plasticizers are believed to interact with the polymer chains in such thermoplastic polymers to speed up viscoelastic response and/or increase chain mobility.

Each plasticizer has its own strength, but all commercially viable plasticizers must have a basic set of performance characteristics. The plasticizer is preferably compatible with PVC resin(s), to provide flexibility. The plasticizer preferably aids in the fusion process, reducing the glass transition temperature (Tg) to a more manageable and safer temperature and facilitating the dissolution and distribution of molecules such that the final part is fully homogeneously dispersed.

One thermoplastic polymer, which has been the subject of much study and commercial utilization, is poly (vinyl chloride) (PVC). In such polymers, one often uses a combination of plasticizers and additives, targeting performance characteristics per a desired end use, while minimizing cost. In such plasticized PVC systems there is usually a "primary plasticizer" and, in some cases, a "secondary plasticizer."

Primary plasticizers tend to increase flexibility of the underlying polymer by directly interacting with the polymer. Primary plasticizers can often be described as "general purpose" or "highly solvating" (fast fusing) plasticizers. Highly solvating plasticizers tend to lower fusion temperatures and times, but can have a negative impact by raising viscosity of a plastisol.

Secondary plasticizers are typically utilized in conjunction with primary plasticizers to either reduce overall plasticizer cost or to obtain improvement in low temperature properties.

One preferred plasticizer is 2,2,4-trimethyl-1,3-pentanediol mono isobutyrate ester (Santicizer 278). Another preferred primary plasticizer for low temperature sealers of the present invention includes alkyl (C12) benzyl phthalate.

Preferred benzoate plasticizers of the present invention include, among others, dibenzoate esters, more preferably (propyleneglycol)1-4 dibenzoates, (ethyleneglycol)1-4 dibenzoates and dibenzoate esters of 2,2,4-trimethyl-1,3-pentane diol. The dibenzoate plasticizers can, in preferred embodiments, be used in mixture with a second (non-benzoate) plasticizer including benzylphthalates and conventional plasticizer species other than benzylphthalates.

Benzylphthalate plasticizers are well known and have found widespread commercial application. Benzylphthalates are alkylbenzylphthalates wherein the alkyl chain, possibly branched and/or substituted, contains from 2 to 16 carbon atoms. Examples of other conventional plasticizers are dialkyl phthalates such as di(2-ethylhexyl)phthalate, di-isononyl phthalate, di-isodecyl phthalate, diundecyl phthalate, dibutyl phthalate, dioctyl phthalate, $C_3$-$C_{24}$ esters of adipic, azelaic, sebacic, trimellitic, citric and phosphoric acid, alkyl esters, of fatty acids, alkyl sulfonic acid esters of phenols and epoxidized triglycerides. A preferred conventional plasticizer, other than benzylphthalates, can be represented by (ethylene glycol)2-4-di($C_2$-$C_{22}$ alcanoate), more preferably -di($C_4$-$C_{16}$ alcanoate).

Provided below are non-limiting examples of structural formulas for plasticizers of the present invention:

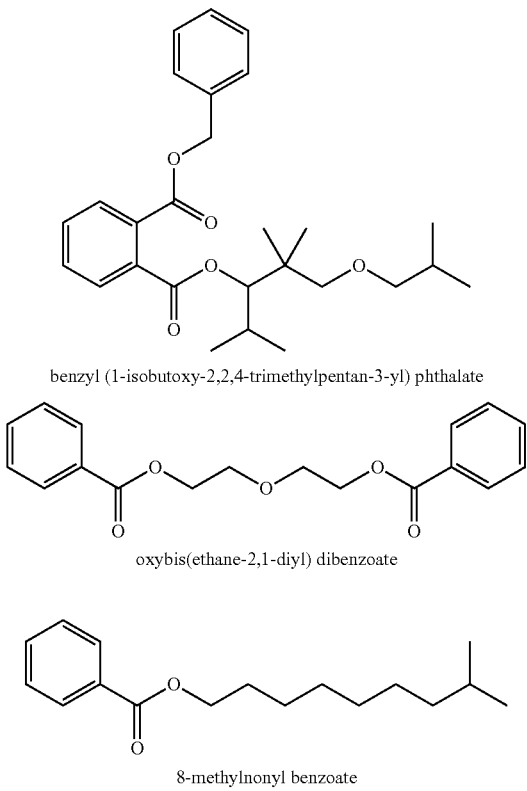

benzyl (1-isobutoxy-2,2,4-trimethylpentan-3-yl) phthalate oxybis(ethane-2,1-diyl) dibenzoate 8-methylnonyl benzoate Flame Retardants During the automobile manufacturing process, the sealants can flame when exposed to hot metal/welds. These flames need to self-extinguish within a predetermined amount of time. Therefore, it is desirable to utilize flame retardants in the formulations of the present invention.

Preferably, the low temperature curable anti-flutter compositions of the present invention contain one or more flame retardants to provide flame retardancy to the adhesive. Flame retardant plasticizers based on phosphate esters effectively replace and avoid the use of the most flammable component, (i.e., the plasticizer itself). Commonly available phosphate ester plasticizers are of three major types: triaryl phosphates, alkyl diaryl phosphates, and their mixtures. Although most phosphate ester plasticizers can be used as primary plasticizers, they are usually blended with lower phthalate ester plasticizers to obtain the desired performances at a minimum loading. Phosphate ester plasticizers were among the first flame retardant additives actively used in elastomeric adhesives.

The flame-retardant plasticizer improving the flame retardancy is not particularly limited as long as it enhances the flame-retardant effect. Preferably, examples of flame retardants include isopropylated triphenyl phosphate, butylated triphenyl phosphate (BPP), isopropylated triphenyl phosphate, tris(chloropropyl)phosphate (TCPP), cresyl diphenyl phosphate (CDP), tris (1,3-dichloro-2-propyl) phosphate (TCP), resorcinol diphenyl phosphate (RDP), and bisphenol A diphenyl phosphate (BDP).

Provided below are non-limiting examples of structural formulas for flame retardants of the present invention:

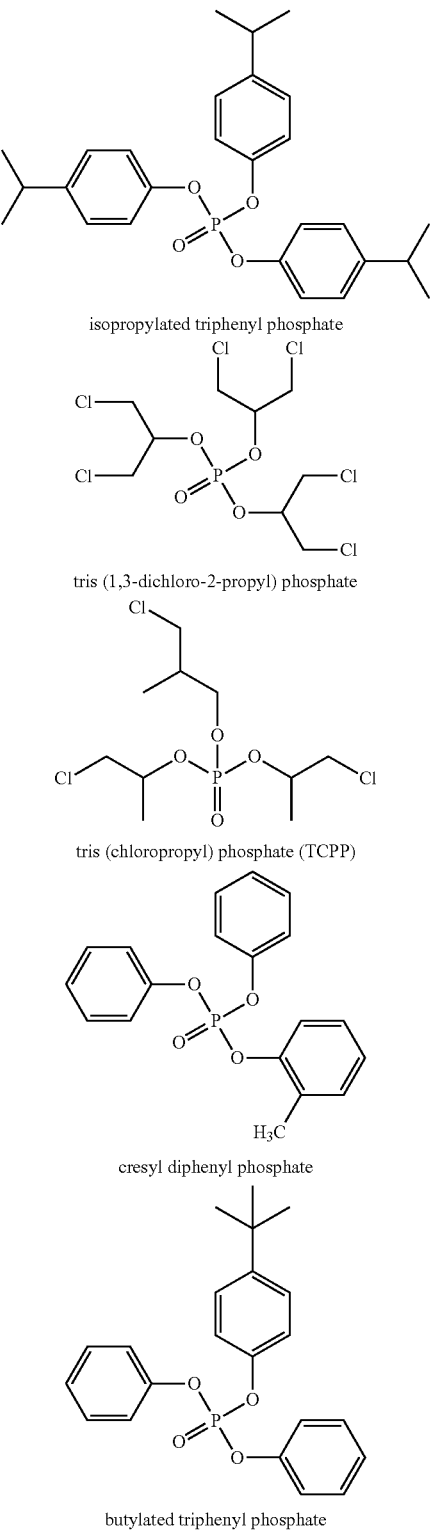

isopropylated triphenyl phosphate tris (1,3-dichloro-2-propyl) phosphate tris (chloropropyl) phosphate (TCPP)

cresyl diphenyl phosphate butylated triphenyl phosphate

Curing Agents

In accordance with the present invention, the low temperature curable anti-flutter compositions can include an initiator or cross-linking agent to at least partially cross-link and cure that composition. The initiator or cross-linking agent can be a heat cure initiator or initiator system comprising an ingredient or a combination of ingredients which at the desired elevated temperature conditions produce free radicals. Suitable initiators may include peroxy materials (e.g., peroxides, hydro peroxides, and per esters) which under appropriate elevated temperature conditions decompose to form peroxy free radicals which are initiating effective for the polymerization of the curable elastomeric sealant compositions. The invention is not limited to special peroxide curing systems. For example, inorganic or organic peroxides are suitable for use in the present invention. Preferred are organic peroxides such as dialkyl peroxides, ketal peroxides, aralkyl peroxides, peroxide ethers, peroxide esters, such as di-tert-butyl peroxide, bis-(tert-butyl peroxy-isopropyl)-benzol, dicumyl peroxide, 2,5-diemthyl-2,5-di (tert-butyl peroxy)-hexane, 1,1-bis-(tert-butylperoxy)-3,3,5-trimethyl-cyclohexane, benzoyl peroxide, tert-butyl cumyl peroxide and tert-butyl per benzoate. A variety of different organic peroxides can be used in the invention. For example, different organic peroxide may be used in the curing of the peroxide curable rubber compound or composition and in the curing of the composition itself. A combination of peroxide may also be used.

Antioxidants

The low temperature curable anti-flutter composition can optionally include one or more antioxidants. These antioxidants help preclude and/or minimize thermal, thermal oxidative or ozone degradation. Non-limiting examples of suitable antioxidants include IRGANOX 245 (2-[2-[2-[3-(3-tert-butyl-4-hydroxy-5-methylphenyl)propanolyoxy] ethoxy]ethyl 3-(3-tert-butyl-4-hydroxy-5-methylphenyl)propanoate) (a sterically hindered phenol or amine derivative), IRGANOX 1010, IRGANOX 1076, IRGANOX MD 1024, and IRGANOX PS 800. These antioxidants are commercially available from BASF.

Provided below are non-limiting examples of structural formulas for antioxidants of the present invention:

Adhesion Promoters

The low temperature curable anti-flutter compositions preferably include one or more adhesion promoters that are compatible with the base polymer system. Examples of commercially available adhesion promoters include octyl trimethoxysilane (commercially available from Momentive under the trade designation A-137), glycidyl trimethoxysilane (commercially available from Momentive under the trade designation A-187), methacryloxypropyl trimethoxysilane (commercially available from Momentive under the trade designation of A-174), vinyl trimethoxysilane, tetra ethoxy silane and its partial condensation products, and combinations thereof. Preferably, the adhesion promoters used in this invention comprise acrylate and methacrylate salts of di- and tri-valent metals. Preferred are the aluminum, zinc and magnesium acrylate and methacrylate salts either alone or in combination.

Special methacrylate with acidic functionality oligomer may improve the adhesion on metallic substrates, and as a positive side effect, enhance the corrosion resistance on metallic substrates through a passivation. Specific examples include methacryloxy ethyl phosphate, methacryloxy ethyl maleate, and methacryloxy ethyl succinate.

Wetting Agents

The low temperature curable anti-flutter compositions preferably include one or more wetting agents to improve adhesion to the substrate. The selection of the wetting agent should primarily depend on the surface tension of the liquid coating material and the critical surface tension of the substrate to be coated. It is generally the case that the surface tension of the coating should be lower than or equal to the surface energy of the substrate in order to achieve good wetting. Poor wetting (i.e., a crawling or beading of the coating) will occur if the surface tension of the coating is higher than the surface energy of the substrate. Substrates with a generally lower surface tension (e.g., plastic parts) or contaminated surfaces (anticorrosion oil residue, release agent) are difficult to wet. Generally, many wetting agents

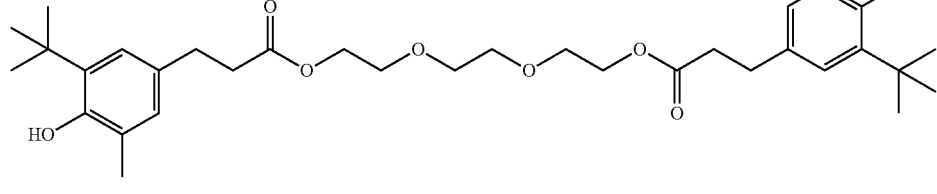

(2-[2-[2-[3-(3-tert-butyl-4-hydroxy-5-methylphenyl)propanolyoxyloxy]ethoxy]ethyl 3-(3-tert-butyl-4-hydroxy-5-methylphenyl)propanoate)

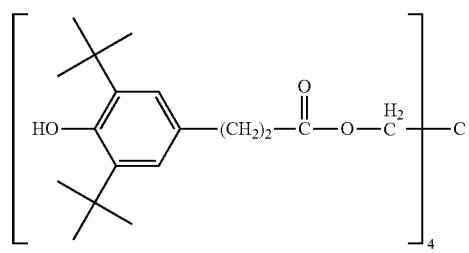

Pentaerythritol tetrakis(3-(3,5-di-tert-butyl-4-hydroxyphenyl)propionate)

are able to reduce the surface tension of an adhesive under the surface energy value, which is relevant for a certain substrate. With this lower tension, the adhesive spreads on the substrate. Surfactants based on polysiloxanes, polyacrylate and fluoro modified surfactants and special wetting agents overcome local differences in surface tension or wet the substrate surface to improve adhesion. Preferably wetting agents of the present invention include, for example, commercially available Tego Disperse 755W, 741W, 653, 670, 652, 656 and BYK 333, 378, 390, 392, and 3750.

Blowing Agents

The low temperature curable anti-flutter compositions preferably include one or more blowing agents. Preferably, the blowing agent is an azodicarbonamide (ADCA) type that is formed by combining one or more activating agents and an ADCA according to a certain proportion, wherein the activating agent is selected from metallic compounds such as chromium, zinc and lead, urea derivatives, nitro guanidine and the like. The lowest decomposition temperature of the blowing agent provided by the invention can reach 112° C.-140° C. The blowing agent is a novel heat absorption type that is stable, compact and comprises a regular foam structure. The blowing agent can be widely used for rolling leathers and rubbers and is simultaneously used for the sealer. Preferably, the blowing agents of the present invention include, for example, modified or unmodified azodicarbonamides, p,p'-oxybis (benzene-sulfonyl) hydrazide, p-toluene sulfonyl hydrazide, and dinitroso pentamethylene tertamine.

Rheology Modifiers

The low temperature curable anti-flutter compositions of the present inventio preferably contain rheological modifiers or control agents to improve the rheology of the formulation. The most common way to control rheological properties of adhesives and sealant is to use a rheological control agents or thixotropic agents as additives. A number of commercially available thixotropic agents, such as precipitated silica, precipitated and coated calcium carbonate, talc, asbestos fibers, modified bentonite clay, fumed silica and certain hydrated magnesium aluminum silicates can be utilized to impart the desired rheological characteristics for the end-use application.

Conductive Carbon Black

The low temperature curable anti-flutter compositions preferably contain one or more conductive fillers, such as electrically conductive carbon black. Preferably, the conductive materials include, for example, commercially available Ketjenblack EC-600JD, Raven 900, and Raven 760 Ultra. When thoroughly dispersed with the polymer, these fillers significantly increase the conductivity of the resulting compound. Due to their unique morphology and structure, excellent conductivity can be obtained even at very low loading levels.

Moisture Scavenger

The low temperature curable anti-flutter compositions of the present invention preferably contain one or more moisture scavengers. The moisture scavengers capture any latent moisture present in the immediate environment or filler in the sealant system. This moisture absorption capability helps to increase the shelf life of the stored product and prevents any premature curing by avoiding the reaction between moisture and the active groups in the sealant. Non-limiting examples of suitable moisture scavengers include calcium oxide, metal aluminosilicates, zeolites, and vinyl trimethoxysilane.

Catalysts

The low temperature curable anti-flutter compositions of the present invention preferably contain one or more catalysts. Treated urea is one preferred catalyst. Other suitable catalysts include organic carbamides and diamines, Other Materials/Adjunct Agents The low temperature curable anti-flutter compositions may also contain other materials, such as fillers, pigments, etcetera. The fillers preferably include calcium carbonates and silicates. Pigments may include non-elemental pigments and elemental pigments, such as, but not limited to, cadmium pigments (e.g., cadmium yellow, cadmium red, cadmium green, cadmium orange, cadmium sulfoselenide, etcetera), chromium pigments (e.g., chrome yellow and chrome green (viridian)), cobalt pigments (e.g., cobalt violet, cobalt blue, cerulean blue, aureolin (cobalt yellow)), copper pigments (e.g., azurite, han purple, han blue, egyptian blue, malachite, paris green, phthalocyanine blue BN, phthalocyanine green, verdigris) iron oxide pigments (e.g., sanguine, caput mortuum, oxide red, red ochre, yellow ochre, venetian red, prussian blue, raw sienna, burnt sienna, raw umber, burnt umber), lead pigments (e.g., lead white, cremnitz white, naples yellow, red lead, lead-tin-yellow), manganese pigments (e.g., manganese violet, YInMn blue), mercury pigments (e.g., vermilion), titanium pigments (e.g., titanium yellow, titanium beige, titanium white, titanium black), zinc pigments (e.g., zinc white, zinc ferrite, zinc yellow), aluminum pigment (e.g., aluminum powder), carbon pigments (e.g., carbon black (including vine black, lamp black), ivory black (bone charcoal)), and ultramarine pigments (e.g., (based on sulfur) ultramarine, ultramarine green shade).

The invention is further described by additional examples and experiments hereinbelow.

TABLE I (Examples of Anti-Flutter Compositions)

| S. No | Composition | Preferred Load (Approximate Wt. %) | More Preferred Load (Approximate Wt. %) |
|---|---|---|---|
| 1 | Elastomer(s)/Rubber(s) | 2-25 | 5-20 |
| 2 | PVC resin(s) | 2-25 | 5-20 |
| 3 | Curing agent(s) | 0.05-5 | 0.1-2 |
| 4 | Moisture Scavenger(s) | 0.1-10 | 0.5-5 |
| 5 | Adhesion promoter(s) | 0.5-10 | 1-8 |
| 6 | Epoxy resin(s) | 1-20 | 2-10 |
| 7 | Curing accelerator(s) | 0.05-5 | 0.1-2 |
| 8 | Blowing agent(s) | 0.05-10 | 0.1-5 |
| 9 | Filler(s) | 0-50 | 10-30 |
| 10 | Thixotropic agent(s) | 0.05-20 | 1-10 |
| 11 | Wetting agent(s) | 0.05-5 | 1-2 |
| 12 | Conductive carbon black | 0.05-5 | 1-2 |
| 13 | Antioxidant(s) | 0.05-5 | 0.1-2 |
| 14 | Plasticizer(s) | 5-40 | 15-35 |
| 15 | Catalyst(s) | 0.05-5 | 1-2 |
| 16 | Adjunct agent(s) | 0-20 | 0.05-10 |

It will be understood that the sealants of the present invention may include any combination of materials disclosed in Table I and/or the present specification and/or experiments provided herein.

TABLE II (Anti-Flutter Composition Details (Experiments 1-4))

| S. No | Composition |
|---|---|
| 1 | Elastomer/Rubber 1 (styrene-butadiene copolymer, slightly cross-linked with divinylbenzene) |
| 2 | Elastomer/Rubber 2 (pre-crosslinked butadiene-acrylonitrile copolymer) |
| 3 | Elastomer/Rubber 3 (acrylonitrile butadiene polymer (NBR)) |
| 4 | PVC resin 1 (PVC homopolymer dispersion resin) |
| 5 | PVC resin 2 (PVC homopolymer gelation resin) |
| 6 | Curing agent ((organic peroxide) 1,1-di(tert-butylperoxy)-3,3,5-trimethylcyclohexane, 90% solution in isododecane) |
| 7 | Calcium oxide |
| 8 | Adhesion promoter (bifunctional 3-glycidyloxypropyltrimethoxysilane) |
| 9 | Epoxy resin (liquid epoxy resin produced from bisphenol-A and epichlorohydrin) |
| 10 | Curing accelerator (micronized dicyandiamide) |
| 11 | Blowing agent (azodicarbonamide) |
| 12 | Filler (calcium carbonate) |
| 13 | Thixotropic agent (precipitated calcium carbonate) |
| 14 | Wetting agent (dimethyl glutarate/2-methoxy-1-methylethyl acetate (1:1 by Wt.)) |
| 15 | Electroconductive carbon black |
| 16 | Antioxidant (pentaerythritol-tetrakis[3-[3,5-di-tert-butyl-4-hydroxyphenyl]propionate) |
| 17 | Plasticizer 1 (linear nonyl phthalate) |
| 18 | Plasticizer 2 (high solvating non-phthalate plasticizer) |
| 19 | Plasticizer 3 (triaryl phosphates, isopropylated) |

TABLE III (Anti-Flutter Sealant Compositions (Experiments 1-4))

| S. No | Composition | Exp. 1 (Wt. %) | Exp. 2 (Wt. %) | Exp. 3 (Wt. %) | Exp. 4 (Wt. %) |
|---|---|---|---|---|---|
| 1 | Elastomer/Rubber 1 | 0.0 | 1.2 | 2.5 | 2.0 |
| 2 | Elastomer/Rubber 2 | 1.2 | 3.5 | 2.5 | 3.0 |
| 3 | Elastomer/Rubber 3 | 0 | 0 | 2.5 | 3.3 |
| 4 | PVC resin 1 | 27.0 | 16.0 | 24 | 25.0 |
| 5 | PVC resin 2 | 10.0 | 5.0 | 0 | 10.0 |
| 6 | Curing agent | 0.1 | 0.15 | 0.15 | 0.1 |
| 7 | Calcium oxide | 1.5 | 1.5 | 1.5 | 1.5 |
| 8 | Adhesion promoter | 3.3 | 1.0 | 0.5 | 4.0 |
| 9 | Epoxy resin | 0 | 7.3 | 7.4 | 7.8 |
| 10 | Curing accelerator | 1.0 | 1.0 | 1.0 | 1.0 |
| 11 | Blowing agent | 0.2 | 1.5 | 2.5 | 3.5 |
| 12 | Filler | 28.0 | 30.0 | 24.0 | 10.0 |
| 13 | Thixotropic agent | 5.0 | 5.0 | 7.0 | 5.0 |
| 14 | Wetting agent | 1.0 | 1.0 | 0 | 1.0 |
| 15 | Conductive carbon black | 0.4 | 0.4 | 0 | 0.4 |
| 16 | Antioxidant | 0.5 | 0.5 | 0.5 | 0.5 |
| 17 | Plasticizer 1 | 10.0 | 10.0 | 14 | 12.0 |
| 18 | Plasticizer 2 | 5.5 | 10.0 | 0 | 5.0 |
| 19 | Plasticizer 3 | 5.5 | 5.0 | 10 | 5.0 |

| | | | Test | Exp. 1 results | Exp. 2 results | Exp. 3 results | Exp. 4 results |
|---|---|---|---|---|---|---|---|
| Initial testing completed after adhesive cure without any aging | Low bake | Steel | Lap shear Strength (Mpa) | 3.12 | 0.16 | 0.46 | 0.15 |
| | | | Cohesive failure (%) | 100 | 100 | 100 | 100 |
| | | AL | Lap shear Strength (Mpa) | 3.42 | 0.14 | 0.57 | 0.16 |
| | | | Cohesive failure (%) | 100 | 100 | 100 | 100 |
| | | CFRP | Lap shear Strength (Mpa) | 3.18 | 0.17 | 0.49 | 0.15 |
| | | | Cohesive failure (%) | 100 | 100 | 100 | 100 |
| | High bake | Steel | Lap shear Strength (Mpa) | 3.48 | 0.16 | 0.55 | 0.16 |
| | | | Cohesive failure (%) | 100 | 100 | 100 | 100 |
| | | AL | Lap shear Strength (Mpa) | 3.45 | 0.16 | 0.65 | 0.17 |
| | | | Cohesive failure (%) | 100 | 100 | 100 | 100 |
| Water resistance bonded cured assembly immersed at 168 h at 55° C. water. | Low bake | Steel | Lap shear Strength (Mpa) | 3.42 | 0.16 | 0.45 | 0.15 |
| | | | Cohesive failure (%) | 100 | 100 | 100 | 100 |
| | | AL | Lap shear Strength (Mpa) | 3.40 | 0.19 | 0.58 | 0.16 |
| | | | Cohesive failure (%) | 100 | 100 | 100 | 100 |
| | | CFRP | Lap shear | 3.35 | 0.15 | 0.55 | 0.14 |

TABLE III-continued (Anti-Flutter Sealant Compositions (Experiments 1-4))

| | | | | | | | |
|---|---|---|---|---|---|---|---|
| Testing shall be done after 24 h minimum recovery from environment | High bake | Steel | Strength (Mpa) Cohesive failure (%) Lap shear Strength (Mpa) Cohesive failure (%) | 100 3.47 100 | 100 0.15 100 | 100 0.62 100 | 100 0.16 100 |
| | | AL | Lap shear Strength (Mpa) Cohesive failure (%) | 3.46 100 | 0.16 100 | 0.6 100 | 0.17 100 |
| Humidity resistance bonded cured assembly exposure to high humidity at 240 h 40 C., 100% RH | Low bake | Steel | Lap shear Strength (Mpa) Cohesive failure (%) | 3.47 100 | 0.17 100 | 0.42 100 | 0.14 100 |
| | | AL | Lap shear Strength (Mpa) Cohesive failure (%) | 3.47 100 | 0.16 100 | 0.44 100 | 0.15 100 |
| | | CFRP | Lap shear Strength (Mpa) Cohesive failure (%) | 3.40 100 | 0.14 100 | 0.60 100 | 0.15 100 |
| Testing shall be done after 24 h minimum recovery from environment | High bake | Steel | Lap shear Strength (Mpa) Cohesive failure (%) | 3.39 100 | 0.16 100 | 0.62 100 | 0.16 100 |
| | | AL | Lap shear Strength (Mpa) Cohesive failure (%) | 3.40 100 | 0.16 100 | 0.63 100 | 0.15 100 |
| Corrosion resistance Bonded cured assembly exposure to Neutral salt spray at 480 h | Low bake | Steel | Lap shear Strength (Mpa) Cohesive failure (%) | 3.36 100 | 0.10 100 | 0.41 100 | 0.14 100 |
| | | AL | Lap shear Strength (Mpa) Cohesive failure (%) | 3.31 100 | 0.16 100 | 0.42 100 | 0.15 100 |
| | | CFRP | Lap shear Strength (Mpa) Cohesive failure (%) | 3.40 100 | 0.14 100 | 0.55 100 | 0.15 100 |
| Testing shall be done after 24 h minimum recovery from environment | High bake | Steel | Lap shear Strength (Mpa) Cohesive failure (%) | 3.36 100 | 0.16 100 | 0.63 100 | 0.16 100 |
| | | AL | Lap shear Strength (Mpa) Cohesive failure (%) | 3.34 100 | 0.16 100 | 0.65 100 | 0.15 100 |
| 2. Expansion rate (%) | | | | 30 | 102 | 310 | 505 |
| 3. Rheometer Viscosity (Pa · s) | | | | 565 | 600 | 1295 | 1400 |
| 4.1. Slide (mm) (Test Sample: 20 mm Dia × 20 mm H (Dob)) | | | | 0 mm | 0 mm | 0 mm | 0 mm |
| 4.2. Sag (mm) (Test Sample: 12.5 H × 25 W × 200 L mm Ribbon) | | | | 0 mm | 0 mm | 0 mm | 0 mm |
| 5. Wash resistance | | | Rotational test method | No bead distortion, No material movement | No bead distortion, No material movement | No bead distortion, No material movement | No bead distortion, No material movement |
| 6. Elongation (%) (ASTM D638) | | | | 60 | 50 | 90 | 130 |
| 7. Young's modulus @ 23° C. (Mpa) (ASTM D638) | | | | 4.0 | 2.0 | 0.45 | 0.5 |
| 8. Hardness (Shore A) | | | | 65 | 30 | 10 | 5 |
| 9. Flame resistance (ASTM D1230-17) | | | | Self-extinguish within 5 sec | Self-extinguish within 5 sec | Self-extinguish within 5 sec | Self-extinguish within 5 sec |
| 10. E- coat compatibility (Cathoguard AD 800) | | | | No cratering | No cratering | No cratering | No cratering |

Low Bake: 140° C. for 15 minutes
High Bake: 190° C. for 60 minutes

TABLE IV (Conventional Anti-flutter and Low Temperature Anti-flutter Comparison)

| Test | | | Conventional Anti-flutter Exp. 5 results | Low temperature Anti-flutter Exp. 3 results |
|---|---|---|---|---|
| Initial (Testing completed after adhesive cure without any aging) Low bake | Steel | Lap shear Strength (Mpa) | 0.27 | 0.46 |
| | | Cohesive failure (%) | 0 | 100 |
| | AL | Lap shear Strength (Mpa) | 0.26 | 0.57 |
| | | Cohesive failure (%) | 0 | 100 |
| | CFRP | Lap shear Strength (Mpa) | 0.26 | 0.49 |
| | | Cohesive failure (%) | 0 | 100 |
| 2. Expansion rate (%) | | | 70 | 290 |
| 3. Rheometer Viscosity (Pa · s) | | | 640 | 1295 |
| 4.1. Slide (Test Sample: 20 mm Dia × 20 mm H (Dob) | | | 0 mm | 0 mm |
| 4.2. Sag (Test Sample: 12.5 H × 25 W × 200 L mm Ribbon) | | | 0 mm | 0 mm |
| 5. Wash resistance | | Rotational test method | No bead distortion, No material movement | No bead distortion, No material movement |
| 6. Elongation (%) (High Bake) (ASTM D638) | | | 30 | 90 |
| 7. Young's modulus @ 23° C. (Mpa) (High Bake) (ASTM D638) | | | 0.25 | 0.45 |
| 8. Hardness (Shore A) | | | 15 | 9 |
| 9. Flame resistance (ASTM D1230-17) | | | Self-extinguish within 5 sec | Self-extinguish within 5 sec |
| 10. E- coat compatibility (Cathoguard AD 800) | | | No cratering | No cratering |

Low Bake: 140° C. for 15 minutes

The above table compares conventional and low temperature anti-flutter compositions (300% expandable). All testing was completed at low bake condition.

When conventional anti-flutter sealer was tested at low bake (140° C./15 minutes) condition, it showed 100% adhesion failure (0% cohesive failure) on metals and plastic substrates.

The conventional sealer expansion rate at low bake condition (140° C./15 minutes) was only 70%.

Conventional anti-flutter elongation and modulus testing also showed low-test results when tested at low bake condition.

The remaining tests for the conventional anti-flutter showed very similar test results to the low temperature anti-flutter.

Therefore, the conventional anti-flutter performs well for 160° C.-190° C. bake condition of automotive application.

Mixing

The low temperature curable anti-flutter components listed in the table were mixed 3 hours by commercially available Bunbury or Baker-Perkins mixer a capacity of 5 kgs.

The low temperature curable anti-flutter sealant may be prepared using conventional processing for the manufacture of polymeric sealants. Typically, the polymers are weighed out and then mixed together using a Bunbury or Baker-Perkins mixer until homogeneous. Then the other constituents are added such as plasticizers, fillers, pigments, blowing and curing agents and activators, if necessary. The entire composition is then mixed thoroughly too substantially uniformly disperse all of the ingredients throughout the sealant. It should be kept in mind that the temperature of the sealant composition during this process should not exceed the activation temperature of the curing action or the blowing action as this will cause the sealant to expand and/or cure prematurely.

All of the copolymers and the filler were placed in the Baker Perkins mixer and heated to 38° C. (100° F.) and mixed for 30 minutes. Then about half of the plasticizer and all of the ground calcium carbonate, pigment and curing agent were added and the entire mixture was mixed until smooth while maintaining the temperature at about 38° C. (100° F.) to about 49° C. (120° F.). The mixture was then cooled to below 49° C. (120° F.) and the rest of the ingredients were added and the mixture was then mixed at temperature until homogeneous. The material was then removed from the mixer and allowed to cool to about 25° C. (77° F.).

Rheometer Viscosity

Viscosities of each formulation in table were evaluated according to rotational TA instrument stress-controlled rheometer. A 25 mm parallel plate geometry was used with an initial gap setting of 450 microns. Adhesive squeeze out was then removed and the gap set to 450 microns to maintain a consistent sample volume. Sample temperature was maintained at 25° C. using temperature control plate of 0.01° C. resolution. A peak hold flow test was run at a shear rate of 3 1/s for 3 minutes with sampling every 10 seconds. The viscosity was taken at 3 minutes where steady was achieved.

Lap Shear Adhesion:

Metal Used for Testing

Aluminum alloys (ex. 6111, 6022, 5754, 5182, 6016) Electrogalvanized steel (0.8 mm) and Carbon fiber reinforced plastic (CFRP)

Lube Used for Testing

List of automotive lubes. (ex. Ferrocote MALHCL 61,61AUS, 6130 and Fuchus 4107S)

Test Sample Preparation and Testing

The lap shear samples were prepared by first cleaning off the existing mill oil on the surface of the metals with acetone/IPA and then applying Ferrocote MALHCL 61 lube on the surface of the test coupon, then the adhesive was applied on the oily surface of the test coupons. The bond line thickness of the adhesive was controlled by using solid glass beads.

The overlap test specimen dimensions are 20 mm×20 mm×1 mm. The joint was held together by putting binder clips on both sides of the joint. Then the overlap test specimen was cured (baked) in the oven as per bake conditions 140° C. for 15 minutes and 190° C. for 60 minutes. Replicates of five overlap test specimens.

Cooling the overlap test specimen to room temperature (about 25° C.), Tests were conducted according to ASTM 1002-10, on the TENSILE TESTER (INSTRON), 30 k N load cell. The specimen tested at rate of 2 inches/min (50 mm/min).

The low temperature curable anti-flutter samples passed all lap shear, water resistances, humidity resistance, corrosion resistance, and adhesion tests.

Sag and Slide (Exp. 3)

Slide Resistance Vertical Free Standing

Five dobs of sealer were applied onto 20 mm diameter×20 mm height on aluminum substrate. A lines was drawn at the bottom of dobs to mark initial material location. The panels were placed in a vertical (90° angle) position. The panels were allowed to sit undisturbed for 21 days at 23° C.+/−2° C., The dobs were measured from the scribe mark then bake the test panels at 140° C. for 15 minutes. All samples passed the vertical slide resistance test with generally no vertical noted.

Sag Resistance Vertical Free Standing (Exp. 3)

A ribbon (12.5×25×200 mm) of material was applied onto the center line of an aluminum panel. The test panel was kept vertical (90° Angle). A scribe mark was established at the bottom of the material on the vertical location. The panel was positioned vertically (90° Angle) at 23° C.+/−2° C. for one hour. The sag was measured and the test panels were then baked at 140° C. for 15 minutes. All samples passed the sag resistance test with generally no displacement noted.

Wash Off Resistance/Rotational Wash Off Method (Exp. 3) and (Exp.

The test material was applied to a 150 mm×30 mm panel (pre-oiled) using a cartridge gun to apply a 12 mm diameter round bead. The test panel was mounted with material into an immersion jig and an immersion tank (preheated water with temperature 60° C.). The jig should provide a travel of 20 cm which corresponds to an acceleration 2 m/s when dropped into the tank. The immersion jig was allowed to drop from a height of 20 cm into the tank unimpeded. The motor speed was set at 120 rpms/minute and turned on for 3 minutes. The motor was turned off and the test panels were evaluated. All samples passed as no bead distortion or sample movement was noted.

ABBREVIATIONS

OEM—Original equipment manufacturer
CLTE—Coefficient of linear thermal expansion
BLRT—Bond line read through
CFRP—Carbon fiber reinforced plastic
CF—Cohesive failure mode
LB—Low bake
HB—High bake
AL—Aluminum
60E—Electrogalvanized steel
Exp. 1—Low expandable anti-flutter (Low temperature bake)
Exp. 2—Standard Expandable anti-flutter (Low temperature bake)
Exp. 3—Medium Expandable anti-flutter (Low temperature bake)
Exp. 4—High Expandable anti-flutter (Low temperature bake)
Exp. 5—Medium Expandable anti-flutter (Conventional bake)

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A low temperature curable anti-flutter composition, comprising: 1.2 wt % pre-crosslinked butadiene-acrylonitrile copolymer rubber; 27.0 wt % PVC homopolymer dispersion resin; 10.0 wt % PVC homopolymer gelation resin; 0.1 wt % organic peroxide curing agent; 1.5 wt % calcium oxide; 3.3 wt % adhesion promoter; 1.0 wt % curing accelerator; 0.2 wt % blowing agent; 28.0 wt % calcium carbonate filler; 5.0 wt % precipitated calcium carbonate thixotropic agent; 1.0 wt % wetting agent; 0.4 wt % conductive carbon black; 0.5 wt % antioxidant; 10.0 wt % linear nonyl phthalate plasticizer; 5.5 wt % high solvating non-phthalate plasticizer; 5.5 wt % triaryl phosphate plasticizer; and wherein the composition exhibits a viscosity of 565 pascal-seconds at 25° C. and cures at 140° C. in 15 minutes to produce 30% volume expansion.

2. A low temperature curable anti-flutter composition, consisting of: 1.2 wt % pre-crosslinked butadiene-acrylonitrile copolymer rubber; 27.0 wt % PVC homopolymer dispersion resin; 10.0 wt % PVC homopolymer gelation resin; 0.1 wt % organic peroxide curing agent; 1.5 wt % calcium oxide; 3.3 wt % adhesion promoter; 1.0 wt % curing accelerator; 0.2 wt % blowing agent; 28.0 wt % calcium carbonate filler; 5.0 wt % precipitated calcium carbonate thixotropic agent; 1.0 wt % wetting agent; 0.4 wt % conductive carbon black; 0.5 wt % antioxidant; 10.0 wt % linear nonyl phthalate plasticizer; 5.5 wt % high solvating non-phthalate plasticizer; 5.5 wt % triaryl phosphate plasticizer; and wherein the composition exhibits a viscosity of 565 pascal-seconds at 25° C. and cures at 140° C. in 15 minutes to produce 30% volume expansion.

* * * * *